(12) United States Patent
Olsson et al.

(10) Patent No.: US 7,525,908 B2
(45) Date of Patent: Apr. 28, 2009

(54) DATA UNIT MANAGEMENT IN COMMUNICATIONS

(75) Inventors: Patrik Olsson, Birmingham (GB); Gjalt de Jong, Leuven (BE)

(73) Assignee: M-Stack Limited, Birmingham (GB)

( * ) Notice: Subject to any disclaimer, the term of this patent is extended or adjusted under 35 U.S.C. 154(b) by 692 days.

(21) Appl. No.: 10/949,942

(22) Filed: Sep. 24, 2004

(65) Prior Publication Data

US 2006/0067238 A1 Mar. 30, 2006

(51) Int. Cl.
*H04J 3/16* (2006.01)
(52) U.S. Cl. .............. 370/229; 370/242; 370/468; 714/748
(58) Field of Classification Search .......... 370/216, 370/229, 235, 503, 230, 231, 232, 233, 242, 370/252, 248, 469, 470, 471, 472, 473, 328, 370/310; 714/748–751; 455/466
See application file for complete search history.

(56) References Cited

U.S. PATENT DOCUMENTS 6,445,917 B1 * 9/2002 Bark et al. ............... 455/423
6,473,399 B1 * 10/2002 Johansson et al. .......... 370/229
6,697,983 B1   2/2004 Chintada et al.
2006/0140197 A1 * 6/2006 Robinson et al. .......... 370/401

FOREIGN PATENT DOCUMENTS

WO   WO 00/62468 A2   10/2000
WO   WO 03/096567 A1   11/2003

* cited by examiner

*Primary Examiner*—Ricky Ngo
*Assistant Examiner*—Dady Chery (57) ABSTRACT

In Radio Link control (REC) apparatus, a mechanism is provided for detecting missing or corrupted data units at the receiving end of a transmission link, requesting retransmission and then monitoring the response to the retransmission request. Distinctively, a receiving communications entity 300 is equipped to act on a nil response. If no data unit is retransmitted, the receiving entity triggers at least one repeat retransmission request. This is the case even if no further data unit is received after the retransmission request is triggered. Retransmission requests are repeated up to a preset number, whereafter a different recovery mechanism is triggered.

24 Claims, 6 Drawing Sheets

DATA UNIT MANAGEMENT IN COMMUNICATIONS

The present invention relates to data unit management in communications. It finds particular application in the management of data loss by use of status reports in link control signalling such as used for the air interface in mobile communications.

BACKGROUND OF THE INVENTION

Mobile communications provides an access technology for portable user equipment ("UE") to gain access to networks without having to use a wired connection. In today's environment, the UE communicates over a radio link to one or more network access points, often but not always those geographically nearest. One or more networks are available via the access points and these networks may be either wireless or fixed line.

An area in which considerable work has been done is in development of UMTS ("Universal Mobile Telecommunications System") technology. The UMTS network architecture can be viewed as two primary parts, the UTRAN ("UMTS Terrestrial Radio Access Network") and the core network. The UTRAN looks after the physical aspects of providing wireless access for a mobile UE to the core network and the core network provides switching. To use a UMTS network, the UE itself must be compatible and therefore includes in its operating environment protocols to support that wireless access.

Figure 1:
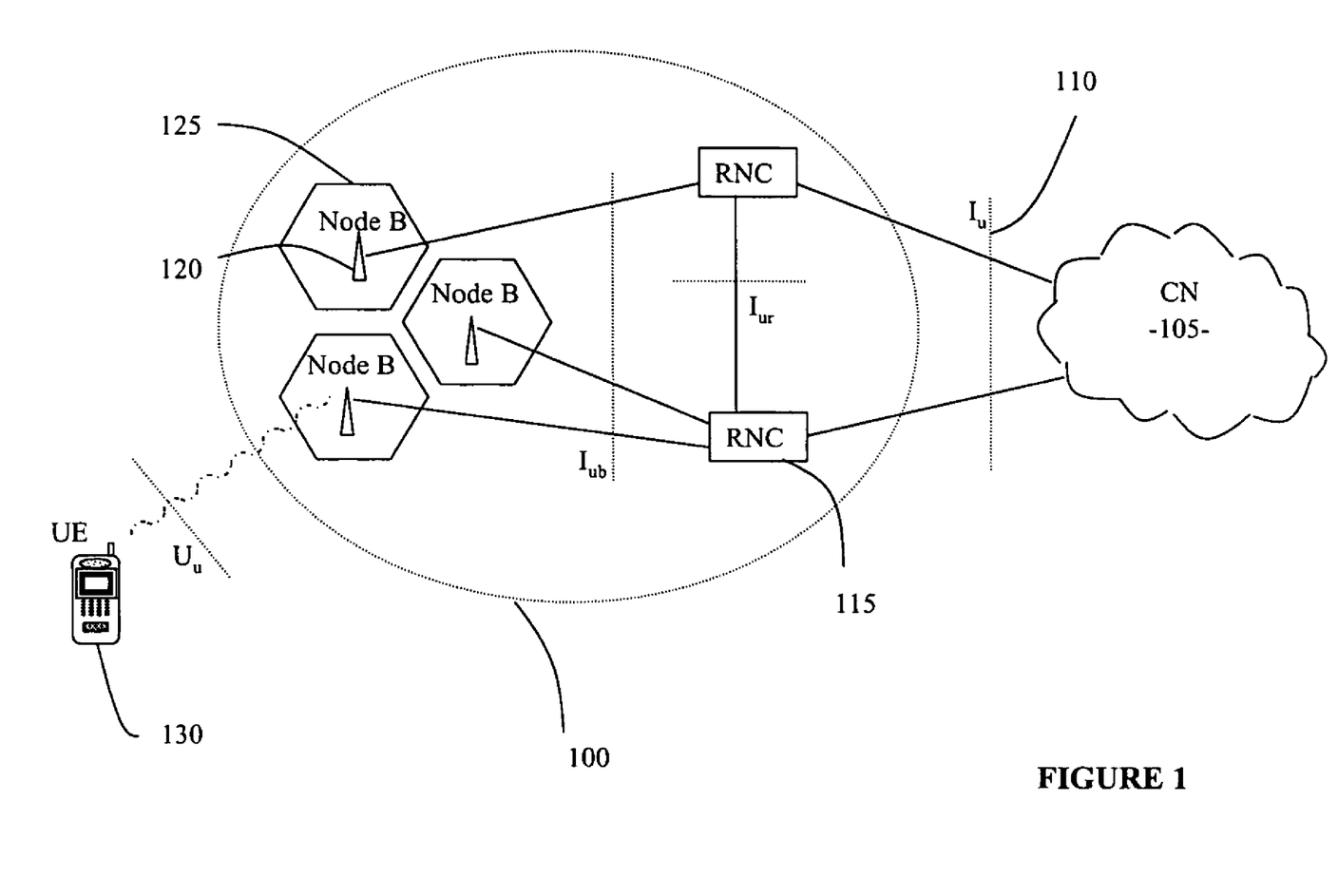
FIG. 1 shows a schematic block diagram of a UMTS cellular network in which the radio link control entity might be applied.

Referring to FIG. 1, the UTRAN is made up of a set of RNSs ("Radio Network Subsystems"). Each RNS comprises one RNC ("Radio Network Controller") and one or more logical nodes known as "Node Bs". Each Node B is a network access point and its associated RNC generally controls the radio resources for providing wireless access across the air interface between a UE and the UTRAN, using the Node B.

Many protocols have been written in the course of mobile communications development. Many of these are used in the core network mentioned above. In order to use the core network, UMTS networks must be equipped with the relevant protocols demanded by the core network interface. However, the main thrust of today's UMTS networks lies in the UTRAN and its protocols to deal with the various radio/air interfaces between the RNCs, the Node Bs and the UEs. In a UMTS network, protocol stacks are used in each of the RNCs, the Node Bs and the UEs. One of these protocols is the Radio Link Control ("RLC") protocol, present in the RNC and the UE.

One of the groups working on UMTS standards is the $3^{rd}$ Generation Partnership Project ("3GPP"). An example of a technical specification published on the Internet by 3GPP that is relevant to embodiments of the present invention is as follows:

TS 25.322 (version 3.16.0, Release 1999)

entitled "Universal Mobile Telecommunications System (UMTS); Radio Link Control (RLC) protocol specification". The versions of this specification for Releases 5 and 6 are also relevant.

The RLC protocol provides a number of services in supporting transfer of data units across the radio/air interfaces. In particular, it sets out behaviour of a sending entity and a receiving entity during the transfer of data units. A list of RLC services is set out in Section 5 of the above technical specification and includes for example flow and error control. Data is assembled into blocks (or "units" or "packets") containing data with added control or signalling information.

In wireless communication systems such as UMTS, data can be lost or corrupted in the transmission. Some applications, such as real time applications, can tolerate at least a proportion of missing data packets but other applications cannot. The RLC protocol caters for these different situations by offering different modes of operation: transparent, unacknowledged and acknowledged. Acknowledged mode is designed for applications which require the receipt of correct data with no missing blocks. In acknowledged mode, every block to be transmitted has a sequence number carried in the control or signalling information and they are generally transmitted in ascending order of sequence numbers. Every block is checked by the receiving entity and status reports are returned to the transmitting entity containing positive and/or negative acknowledgements ("ACKs" and "NACKs") with respect to the sequence numbers of blocks to be received. ACKs acknowledge receipt of correct blocks and NACKs trigger retransmission of missing or damaged blocks. However, the status reports are equally subject to the transmission problems of loss and corruption.

Although much has been done to deal with lost RLC signalling, such as TIMER_POLL to deal with a lost poll for a status report and TIMER_MRW to deal with a lost signal to move an existing transmission window, it has been recognised that there is at least one area the current RLC protocol doesn't cover adequately. Although TIMER_POLL will detect lost status reports which were sent in response to a poll, there has been nothing in place to detect lost status reports which have been triggered at the receiving end of a transmission, for example because incoming data blocks are corrupted or missing. This is particularly important where the status reports contain NACKs.

An initial solution was known as the "EPC" mechanism, standing for Estimated PDU Counter. (PDUs are further discussed below but in this context a PDU is a data block.) When a status report was sent out, the EPC mechanism did two things. It timed a period equivalent to the round trip time for a status report to trigger receipt of a retransmitted PDU. It also took current transmission rates into account by setting a counter to the estimated number of missing PDUs and then decrementing the counter at the rate of all incoming PDUs. At the end of the period and depending on the content of the counter, the safe receipt of the missing PDUs was checked and updated status reports were sent out for those still missing. The EPC mechanism was found unclear however and later abandoned.

Another, recently proposed solution is as follows. A receiving entity monitors the sequence numbers of received blocks. If blocks are missing or damaged, it sends a status report back to the transmitting entity, the report comprising NACKs identifying the missing or damaged blocks. At the same time, it sets a timer which times a period equivalent to the round trip for a NACK going to the transmitting entity and the transmitting entity responding. After the round trip period, if a block is now received with a later sequence number than any of the blocks subject to a NACK, there has only been a nil or partial response to the status report and the status report must have been damaged or lost. The receiving entity now sends a fresh status report and the process is repeated until all blocks are correctly received.

Both the EPC mechanism and this known proposed solution are not sufficient. Both rely on receiving further fresh blocks to be transmitted in order to deal with an error. They do not deal with the case where there are no more blocks transmitted from the transmitting entity, such as when the last block has been sent for some extended period of time. In practice, the proposed solution can, in certain circumstances, completely stall the transmission of data.

In more detail, stalling can arise as follows. The transmitting and receiving entities work within a shared, sliding transmission window of block sequence numbers. The transmitting entity will only send blocks whose numbers are in the window and these are the blocks the receiving entity expects to receive. When a sequence of blocks at the beginning of the window have been correctly received by the receiving entity, the transmission window is moved along to the next set of sequence numbers. If a status report identifying a lost or damaged block has itself been lost, then the transmitting entity may have stopped transmitting before the round trip time period has expired, simply because it has reached the end of the window. In this circumstance, after the round trip time period has expired, the receiving entity will never receive a block with a later sequence number than the blocks subject to a NACK in the lost status report. It will not be triggered to repeat the status report but neither will the transmission window be moved forward because not all the blocks in the current shared set of sequence numbers have been received.

BRIEF SUMMARY OF THE INVENTION

According to a first aspect of embodiments of the present invention, there is provided data unit management apparatus for use in communications receiving equipment in receiving data units over a transmission link, the apparatus comprising:
i) a data unit reception monitor for monitoring receipt of data units;
ii) a retransmission request sender for triggering the sending of at least one retransmission request in respect of one or more missing or corrupted data units; and
iii) a retransmitted data unit monitor for monitoring receipt of one or more retransmitted data units, wherein the retransmitted data unit monitor comprises a timer for timing a predetermined period, and is adapted to monitor receipt within the predetermined period of retransmitted data units.

By making a positive check for receipt of at least one data unit identified in the retransmission request, embodiments of the present invention in its first aspect avoid the significant pitfall of the prior art described above which can lead to "stalling", ie termination of data transmission. That is, embodiments of the present invention only try to detect one or more retransmitted data units whereas the prior art relies on receiving at least one "fresh", that is transmitted for the first time, data unit. Embodiments of the invention thus avoid problems such as stalling of the transmission window because retransmitted data units are necessarily in the current transmission window of sequence numbers whereas a fresh one may not be.

It has further been recognised in making the present invention that it is only necessary to receive correctly one data unit identified in the retransmission request for the receiving entity to "know" that the retransmission request was delivered to the transmitting entity. For example in RLC signalling, this is true however many data units were identified by NACKs in a status report (that is, the retransmission request). However, where more than one NACK was sent in a status report, it may be preferred to monitor until at least two or perhaps all the data units identified by NACKs in the status report have been received, for increased certainty.

In systems using signalling such as RLC signalling, each received data unit may be identifiably distinct and the receiving equipment is adapted to assemble said identifiably distinct data units in an ordered sequence of data units. The retransmitted data unit monitor may than be adapted to identify a retransmitted data unit by reference to its position in a sequence of data units received by the receiving equipment relative to its position in said ordered sequence.

In one way of doing this, the data unit management apparatus may further comprise a sequence reception state monitor for monitoring the reception state of said ordered sequence by reference to the position in the ordered sequence of received data units, the sequence reception state monitor being adapted to maintain updatable values for at least two variables representing said reception state. The retransmitted data unit monitor may then be adapted to identify a retransmitted data unit by comparing its position in the ordered sequence with current values for said at least two variables. A current value for one of these variables may be set by the most recently received data unit whose position in the ordered sequence is in-sequence (that is, all preceding data units in the ordered sequence have been received and are not corrupted). A current value for another of these variables may be set by the received data unit whose position is latest in the ordered sequence.

An important characteristic of embodiments of the present invention is that a nil response to a retransmission request is enough for data unit management apparatus to act on. Thus, for example, the retransmitted data unit monitor may be adapted to trigger at least one repeat retransmission request in the event that no data units subject to an earlier retransmission request are received within the associated predetermined period.

Perhaps most importantly, embodiments of the present invention can take positive action even in the case that no data units are received, either retransmitted or fresh, during the predetermined period. Thus the retransmitted data unit monitor may be adapted to trigger at least one repeat retransmission request in the event that no data units, whether subject to an earlier retransmission request or not, are received within the associated predetermined period.

Optionally, the predetermined period is at least partially dependent on the number of data units for which a retransmission request is made. In different circumstances, this dependency may be chosen to be a direct or an inverse dependency.

Embodiments of the invention are particularly relevant to communications involving less dependable forms of transmission link, such as air interfaces, including for example radio. However, they may also be found advantageous where there is a link layer in the protocol stack, such as in cable modems and possibly as part of the TCP/IP ("Transmission Control Protocol/Internet Protocol") control for example in the context of mobile IP.

According to a second aspect of embodiments of the present invention, there is provided a method of receiving identifiably distinct data units at a receiving entity from a transmitting entity, which method comprises the steps of:
a) detecting at the receiving entity one or more lost or damaged data units;
b) sending to the transmitting entity a retransmission request identifying at least one of said lost or damaged unit(s) for retransmission; and
c) monitoring data units received at the receiving entity for receipt of at least one data unit so identified within a predetermined time period after sending the retransmission request.

Further advantageous method steps, and preferred characteristics of those set out above, are described in the following description of embodiments of the present invention and/or set out in the claims appended hereto.

BRIEF DESCRIPTION OF THE DRAWINGS

A radio link control entity for use in receiving apparatus in mobile communications according to embodiments of the present invention will now be described, by way of example only, with reference to the following figures in which.

DETAILED DESCRIPION

Referring to FIG. 1 and as described above, a UMTS cellular network usually has two primary parts, the UTRAN 100 and the core network 105. The UTRAN 100 looks after the physical aspects of providing wireless access for a mobile UE 130 to the core network 105 and the core network provides switching. The UTRAN and the core network communicate with each other via an interface known as the "$I_u$" 110.

The UTRAN 100 is made up of a set of RNSs ("Radio Network Subsystems"). Each RNS comprises a RNC ("Radio Network Controller") 115 and one or more logical nodes known as "Node Bs" 120. The RNC 115 provides functionality similar to the base station controller in GSM ("Global System for Mobile communication") networks and each Node B 120 is the access point of a cell 125, equivalent to the base station in GSM networks. The interfaces between these various pieces of equipment are known as follows:

RNC 115—RNC 115: "$I_{ur}$"
RNC 115—Node B 120: "$I_{ub}$"
Node B 120—UE 130: "$U_u$"

Figure 2:
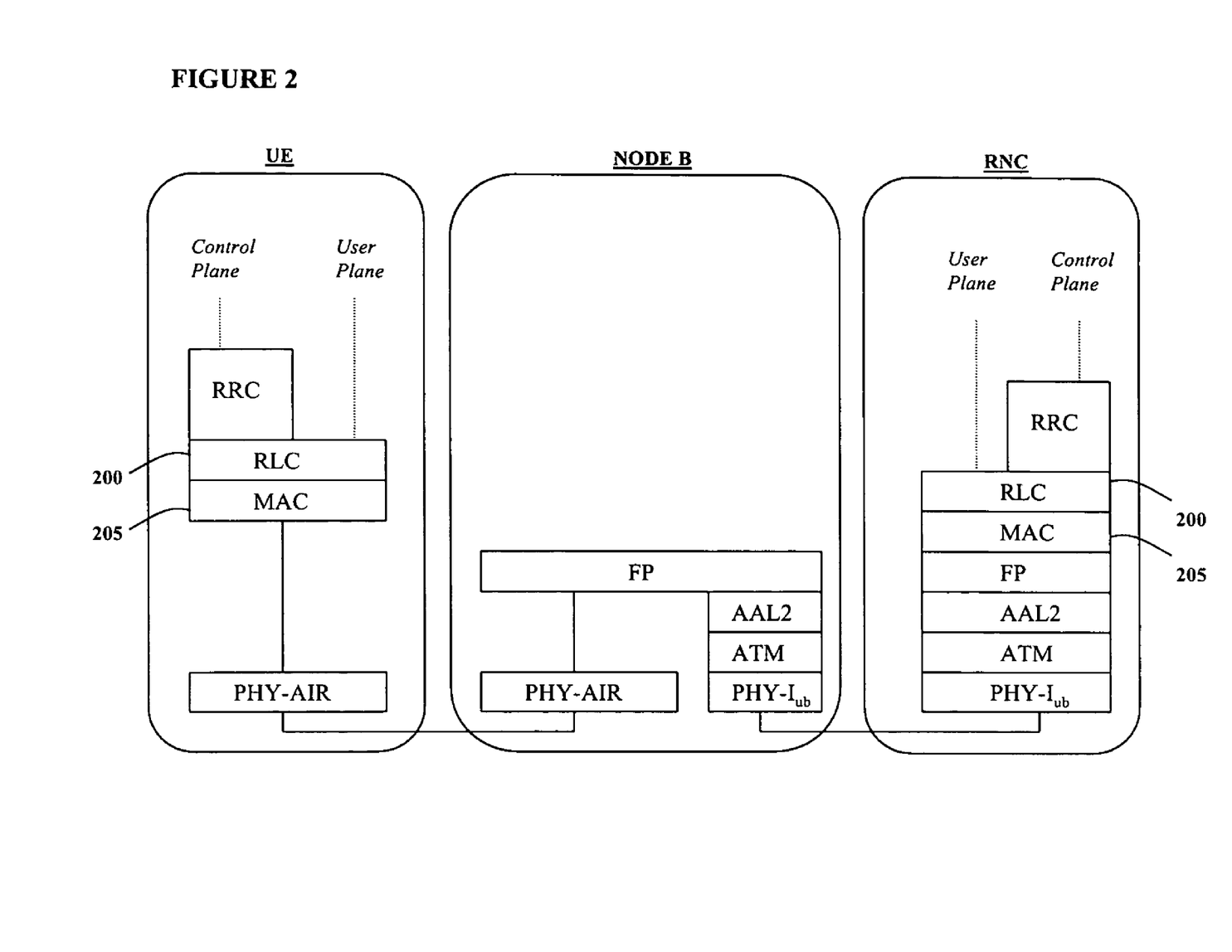
FIG. 2 shows a schematic block diagram of protocol stacks that might be present in relation to the network of FIG. 1 to support the radio link control entity.

Referring to FIG. 2, standardised protocol stacks have been developed for use in a UMTS-compatible UE 130 and in the UTRAN 100. Published technical specifications are available to describe these, including TS 25.322 (version 3.16.0, Release 1999) mentioned above. TS 25.322 describes the RLC protocol 200 which is particularly relevant to embodiments of the present invention. Entities built according to the RLC protocol 200 will be present in the UE 130 and the RNC 115. The Node B 120 has no functions to which the protocol is relevant. In the protocol stacks of the UE 130 and the UTRAN 100, the RLC 200 sits just above the Medium Access Control ("MAC") protocol 205 and is present in both the user and the control planes. That is, both control and user data will be subject to the RLC protocol 200.

Figure 3:
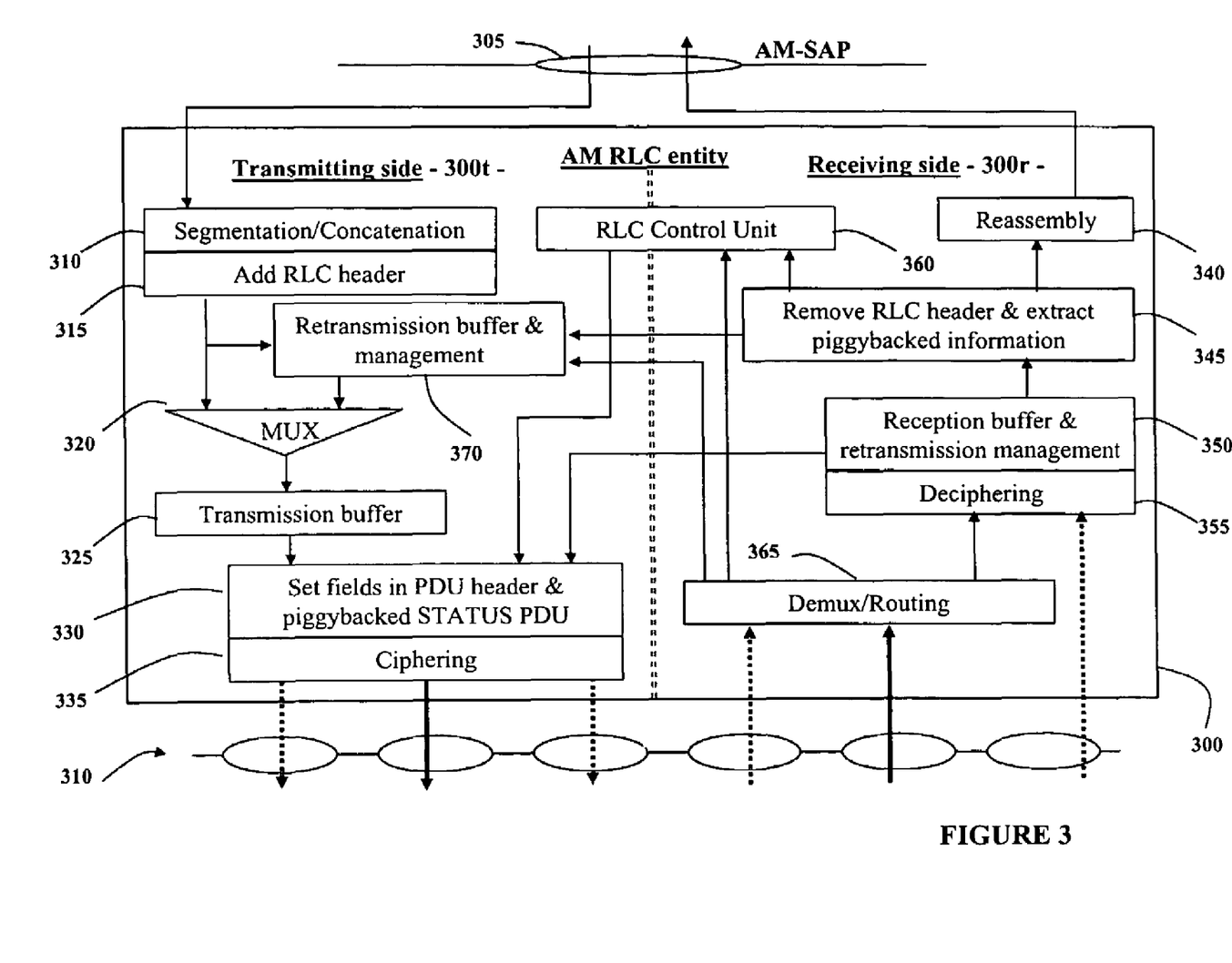
FIG. 3 shows a functional block diagram of components of the radio link control entity.

Referring to FIG. 3, to support acknowledged mode ("AM") transmissions, a RLC entity 300 has both a transmitting side 300$t$ and a receiving side 300$r$. The transmitting side 300$t$ receives service data units ("SDUs") from upper layers through an acknowledged mode service access point ("AM SAP") 305. It converts these to PDUs which it sends to lower layers for transmission via logical channels 310. The receiving side 300$r$ conversely receives PDUs via the logical channels 310 and converts these to SDUs which it sends to the upper layers.

The area of interest in embodiments of the present invention is the management of PDUs being sent and received via the logical channels. The conversion to and from SDUs is not therefore discussed herein in detail. However, SDUs can be either longer or shorter than PDUs and the conversion process may include segmentation of an SDU between more than one PDU, concatenation of SDUs into one shared PDU, and/or padding of a PDU to compensate where the length of a SDU is not equivalent to an integral number of PDUs.

1. Protocol Data Units (PDUs)

PDUs are data units formatted primarily to transmit ongoing user data between peer RLC entities. In acknowledged mode, there are two types of PDU, these being:

AMD PDUs (acknowledged mode data PDUS)— for carrying the user data itself; and

Control PDUs— for carrying control signals which originate at the peer RLC entities for use in managing the correct receipt of the AMD PDUs.

In practice, certain control signals can also be transferred within AMD PDUs. AMD PDUs are of a semi-static length fixed by the upper layers and may be carrying padding if the user data does not fill them. A STATUS PDU carrying a status report can be piggybacked in place of such padding. AMD PDUs also include at least one field which can be set to carry a control signal, such as a polling bit field which can be set by the transmitting side 300$t$ to request a status report of the receiving side 300$r$.

The formats and parameters of RLC PDUs are set out in Section 9.2 of TS 25.322 mentioned above. In acknowledged mode, there are five types of PDU: AMD; STATUS; piggybacked STATUS; RESET; and RESET ACK. The first three of these are of interest in embodiments of the present invention.

AMD PDU

All AMD PDUs carry a sequence number and they are transmitted in ascending sequence between the RLC entities.

Figure 4:
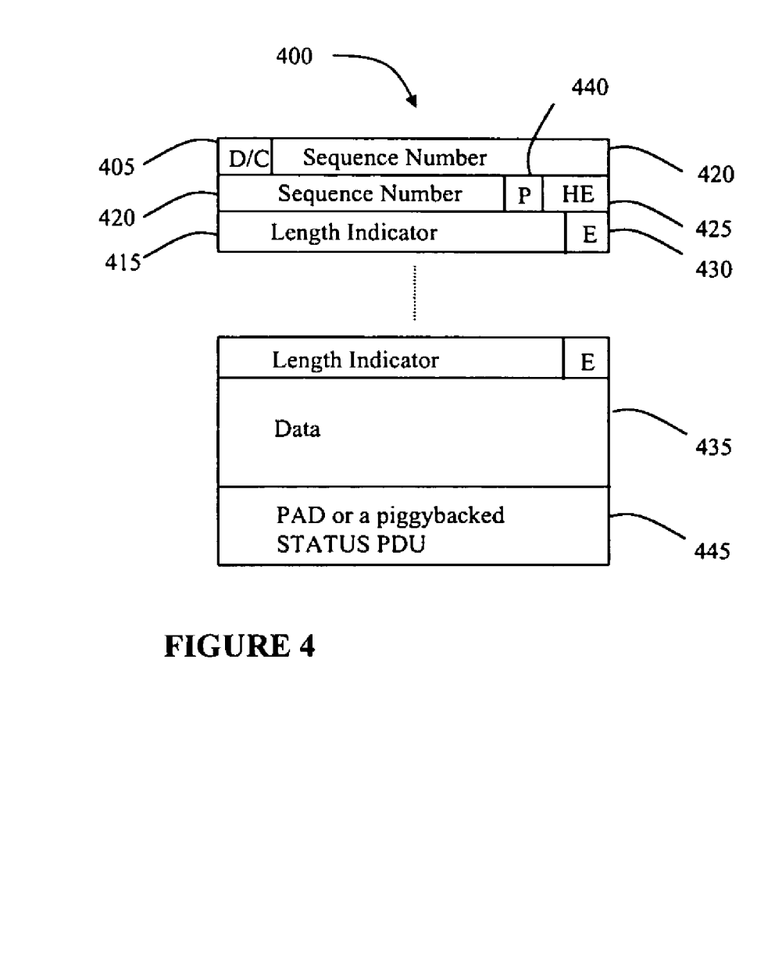
FIG. 4 shows the format of an acknowledged mode data PDU ("AMD PDU")

Referring to FIG. 4, the format of an AMD PDU 400 is as follows. It is octet-based and has a number of fields:

Data or control PDU (D/C) 405: specifies whether the PDU is a data or a control PDU. This will be set to "D" for AMD PDUs Sequence Number 420: the sequence number of the AMD PDU Polling bit 440: used to request a status report from the receiving side 300$r$ of the peer RLC entity 300

Header Extension bit 425: indicates whether the next octet will be header information or data Extension bit 430: indicates whether the next octet will be further header information or data Length Indicator 415: this optional field can be used where concatenation of SDUs or padding has taken place. It indicates the end of the last segment of a SDU. It can also indicate whether padding or piggybacked control information is present in the PDU Data 435: data from the higher layers is mapped into this field PAD 445: padding or a STATUS PDU can be carried here if not already filled by data.

STATUS PDU

Figure 5:
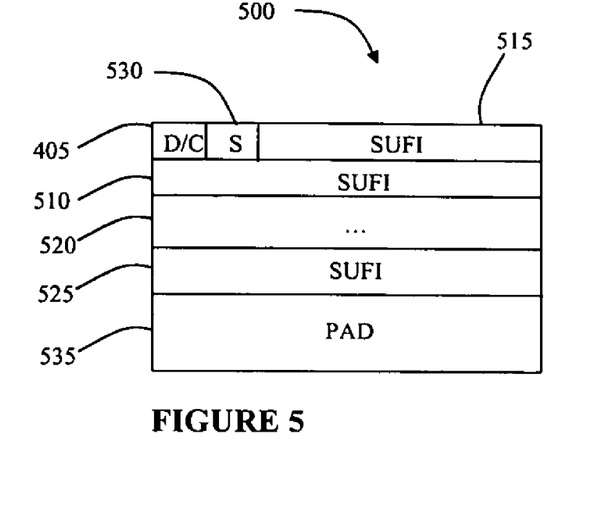
FIG. 5 shows the format of a control PDU such as a STATUS PDU.

Referring to FIG. 5, the format of a STATUS PDU 500 again is octet-based and can include variable length super-fields ("SUFI"s) of different types. Each SUFI however can include three sub-fields, these being type information (type of super-field, for example bitmap or list), length information and a value. Which SUFI fields are used is implementation dependent. The size of a STATUS PDU is variable. Padding can be included to match a PDU size used by the logical channel on which the control PDUs are sent.

A STATUS PDU includes the following fields:

Data or control PDU (D/C) 405: as above. This will be set to "C" for control PDUs PDU Type 530: As shown, this field carries the value "S" which indicates that the control PDU is a status report PDU Super Fields (SUFI) 510, 515, 520 and 525: These fields contain the information about ACKed and NACKed PDUs. Types of SUFI that can carry ACKs and NACKs are:

Bitmap 510: the bitmap SUFI is a variable length parameter containing a start sequence number and a bitmap where each bit represents an ACK or NACK of PDUs in respect of the start sequence number.

List 515: the List SUFI is a variable length parameter containing a start sequence number and a list of sequence numbers for NACKed PDUs having later sequence numbers Rlist 520: the Relative List SUFI is a variable length parameter containing a start sequence number and a list of relative distances of NACKed PDUs having sequence numbers later than the start sequence number ACK 525: the acknowledgement SUFI has just a type identifier field ("ACK") and a last sequence number field ("LSN"). A sequence number in the sequence number field acknowledges the reception of all AMD PDUs up to the LSN so far as they are not indicated as erroneous in earlier parts of the STATUS PDU. The ACK SUFI also indicates the end of the data part of the STATUS PDU, being followed only by padding PAD 535: padding to match a PDU size for the logical channel.

The format of a piggybacked STATUS PDU is the same as for the STATUS PDU except that the D/C field 405 is replaced by a reserved bit "R2". Also the PDU Type field 530 is set to "000".

Figure 6:
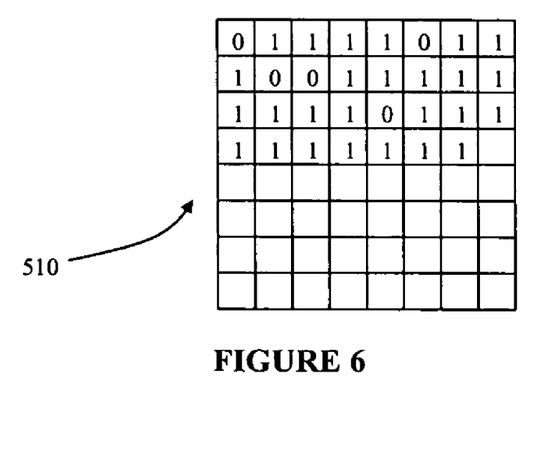
FIG. 6 shows a bit map constituting a status report that might be carried in a STATUS PDU of the format shown in FIG. 5.

Referring to FIG. 6, in its bitmap form, a status report 510 in more detail comprises a set of "1"s and "0"s. Each "1" represents an ACK message, meaning the AMD PDU was correctly received, while each "0" represents a NACK message, meaning the AMD PDU needs to be retransmitted.

2. PDU Transmission/Reception

Referring again to FIG. 3, the overall data transmission process is that the transmitting side 300t of a RLC entity 300 will receive SDUs from the upper layers via the AM-SAP 305. The SDUs are converted, by a segmentation/concatenation process 310 as necessary, to fit the length of an integral number of AMD PDUs. If necessary, padding is used. An RLC header is added and the PDUs are loaded to a retransmission buffer 370 and to a multiplexer 320 for delivery to a transmission buffer 325.

During transmission, status reports are received from the peer RLC entity 300 that is receiving the AMD PDUs. The status reports contain ACKs and/or NACKs in respect of the individual AMD PDUs. If an ACK is received in respect of an AMD PDU, the management function of the retransmission buffer 370 will delete it from the buffer 370. If, however, a NACK is received in respect of an AMD PDU, it must be retransmitted. The management function of the retransmission buffer 370 will deliver that AMD PDU to the multiplexer 320 for retransmission via the transmission buffer 325. AMD PDUs for retransmission are given higher priority than AMD PDUs being transmitted for the first time.

AMD PDUs multiplexed into the transmission buffer 325 go next to a field setting function 330. This field setting function 330 receives inputs from the RLC control unit 360 as to how to set the various fields, for instance whether to set the polling bit to request a status report. Control PDUs may be added at the field setting function 330. These may be separate PDUs or piggybacked in place of padding in AMD PDUs. For example, these control PDUs may be resynchronisation PDUs triggered by the RLC control unit 360 and/or STATUS PDUs received from a reception buffer and retransmission management function 350 on the receiving side 300r of the same RLC entity 300. The AMD PDUs and any added control PDUs are then submitted via a ciphering function 335 to the lower layers for onward transmission via the logical channels 310.

In acknowledged mode, the RLC entity 300 can be configured to use either one or two logical channels 310. The use of one logical channel is indicated in FIG. 3 by a solid arrow showing the flow of PDUs to and from the lower layers while the use of two channels is indicated by two broken arrows. Once a transmission is underway, both AMD and control PDUs will be transmitted. If one channel is used then all the PDUs are carried by that channel. If two channels are used, AMD PDUs and control PDUs are carried on separate channels.

At the peer RLC entity, the receiving side 300r receives the PDUs from the lower layers, via the logical channels 310. If one channel is being used, all the PDUs go to the demultiplexing/routing function 365 and are then routed appropriately within the receiving side 300r. If two channels are being used, only control PDUs go to the demultiplexing/routing function 365 while the AMD PDUs go via a deciphering function 355 to a reception buffer and retransmission management function 350.

The AMD PDUs are stored in the reception buffer of the buffer and retransmission management function 350 until a complete SDU has been received. The retransmission management function automatically creates status reports containing ACKs and/or NACKs with respect to the incoming AMD PDUs and these are delivered directly to the field setting function 330 on the transmitting side 300t of the same RLC entity 300 for transmission back to the peer RLC entity 300 which sent the AMD PDUs.

Any piggybacked STATUS PDU found in an AMD PDU is delivered to the retransmission buffer and management function 370 on the transmitting side 300t of the RLC entity 300 where it is used in purging the buffer 370 of positively acknowledged AMD PDUs.

Once a complete RLC SDU has been received, the associated AMD PDUs are reassembled by the reassembly unit 340 and delivered to upper layers via the AM-SAP 305.

Incoming control PDUs are directed as appropriate by the demultiplexing/routing function 365. Resynchronisation reports are delivered to the RLC control unit 360 for processing and acting on as necessary. STATUS PDUs are delivered to the retransmission buffer and management function 370 on the transmitting side 300t of the same RLC entity 300 in order to purge the buffer of positively acknowledged AMD PDUs.

The sending of a status report is controlled by a number of parameters. A status report can be triggered by any of the following:
- an incoming poll bit on a PDU, such as where a transmitting entity 300 is configured to set a poll bit on the last PDU in its buffer 370
- a PDU is found missing or corrupt and the RLC entity 300 is configured with "missing PDU indicator"
- the periodic status report is configured and the corresponding timer has expired.

(It might be noted that the RLC acknowledged mode of transmission can be used without "missing PDU indicator" being configured but, in that case, a RLC receiving entity 300 according to the technical specification TS 25.322 referenced above would not send a status report unless polled by the transmitting end or the periodic status report timer has expired.)

To prevent too many status reports being sent in a too short period of time, there is also in RLC a status report prohibit function that effectively starts a timer when one report is sent and the RLC entity 300 is not allowed to send another report until the timer expires. Hence a status report can be triggered but not transmitted, or at least not transmitted immediately. Many situations can trigger status reports but only a few triggered actually get sent immediately. The status report monitoring of embodiments of the present invention however should disregard the status prohibit function when a status report is going to be retransmitted.

3. RLC State Variables and the Transmission Window

The following discusses some of the state variables used in acknowledged mode communication to specify the peer-to-peer protocol. A fuller set of state variables is set out in Section 9.4 of TS 25.322 mentioned above. These variables support for example the shared, sliding transmission window of data block sequence numbers within which the RLC entities 300 expect to communicate at any one time. Variables "VT" are maintained by the transmitting entity 300 and variables "VR" are maintained by the receiving entity 300.

VT(A)—Acknowledge state variable:
the lowest sequence number for which an AMD PDU has been sent but there has not yet been received an ACK. This provides the lower end of the transmission window. This variable is only updated on receipt of an ACK SUFI 525 and not on the basis of other fields of status reports.

VT(S)—Send state variable:
the sequence number of the next in-sequence AMD PDU to be transmitted for the first time.

VT(MS)—Maximum Send state variable:
VT(A) plus the transmission window size. VT(MS)-1 is the last sequence number that can be expected to be acknowledged by the receiving RLC entity 300 and forms the upper limit of the transmission window.

VR(R)—Receive state variable:
the expected sequence number of the next in-sequence AMD PDU to be received. This variable is updated whenever a new AMD PDU arrives in sequence.

VR(MR)—Maximum Acceptable Receive state variable:
maximum expected sequence number. Equals VR(R) plus the transmission window size.

VR(H)—Highest Expected state variable:
highest sequence number received so far, plus 1.

A novel state variable used in embodiments of the present invention is:

VT(SRR)—Status Report Retransmission state variable:
the number of times a status report has been retransmitted. VT(SRR) is updated by a counter 700 provided on the receiving side 300r of a RLC entity 300 and this is further discussed below with reference to FIG. 7.

Two examples are now given of updates in state variables on the receiving side ("RX") for sequences of transmission events in which AMD PDUs with sequence numbers ("SN") as given are sent from the transmitting side ("TX") of a first RLC entity 300 to the receiving side ("RX") of a second RLC entity 300. Example 1 shows updates in state variables where a sequence of AMD PDUs is correctly transmitted and received while Example 2 shows updates in state variables where an AMD PDU (SN=2) is lost and a status report requesting retransmission is also lost.

EXAMPLE 1

Normal Sequence with "Poll-On-Last-PDU" Configured

| TX | RX |
|---|---|
| → | SN=0 => VR(R)=1 VR(H)=1 |
| → | SN=1 => VR(R)=2 VR(H)=2 |
| → | SN=2 => VR(R)=3 VR(H)=3 |
| → | SN=3 => VR(R)=4 VR(H)=4 |
| → | SN=4 => VR(R)=5 VR(H)=5 |
| → | SN=5 => VR(R)=6 VR(H)=6 |
| → | SN=6 => VR(R)=7 VR(H)=7 |
| → | SN=7 => VR(R)=8 VR(H)=8 |
| → | SN=8 => VR(R)=9 VR(H)=9 (poll bit set on PDU) |
| ← | ACK SN=9 => VT(A)=9 |

EXAMPLE 2

Lost PDU Retransmitted with "Poll-On-Last-PDU" Configured

| TX | RX |
|---|---|
| → | SN=0 => VR(R)=1 VR(H)=1 |
| → | SN=1 => VR(R)=2 VR(H)=2 |
| → | corrupt PDU discarded |
| → | SN=3 VR(H)=4 |
| ← | status report NACK SN=2 lost |
| → | SN=4 VR(H)=5 |
| → | SN=5 VR(H)=6 |
| → | SN=6 VR(H)=7 |
| → | SN=7 => VR(H)=8 |
| ← | status report NACK SN=2 retransmitted => VT(SRR)=1 |
| → | SN=2 => VR(R)=8 VR(H)=8 (PDU SN=2 retransmitted) |
| → | SN=8 => VR(R)=9 VR(H)=9 (poll bit set on PDU) |
| ← | ACK SN=9 => VT(A)=9 |

("Poll-on-last-PDU" is configured by the UTRAN in known manner, dependent on various conditions. It causes the transmitting side 300t to request a status report by setting a poll bit in the last PDU to leave the transmission buffer 325.)

In embodiments of the present invention, the event of interest in Example 2 is the loss of the status report containing a NACK for the sequence number 2. At this point, a timer on the receiving side 300*r* starts timing a predetermined period and a monitoring function starts monitoring for receipt of any AMD PDU having a sequence number that related to a NACK in the status report. In the example, the period times out and AMD PDU (SN=2) has not been received. The status report is therefore retransmitted, whereafter AMD PDU (SN=2) is received, VR(R) can be updated and the transmission sequence is successfully completed. This mechanism is further described below, with particular reference to FIGS. 8 and 9.

4. Status Report Monitoring

Figure 7:
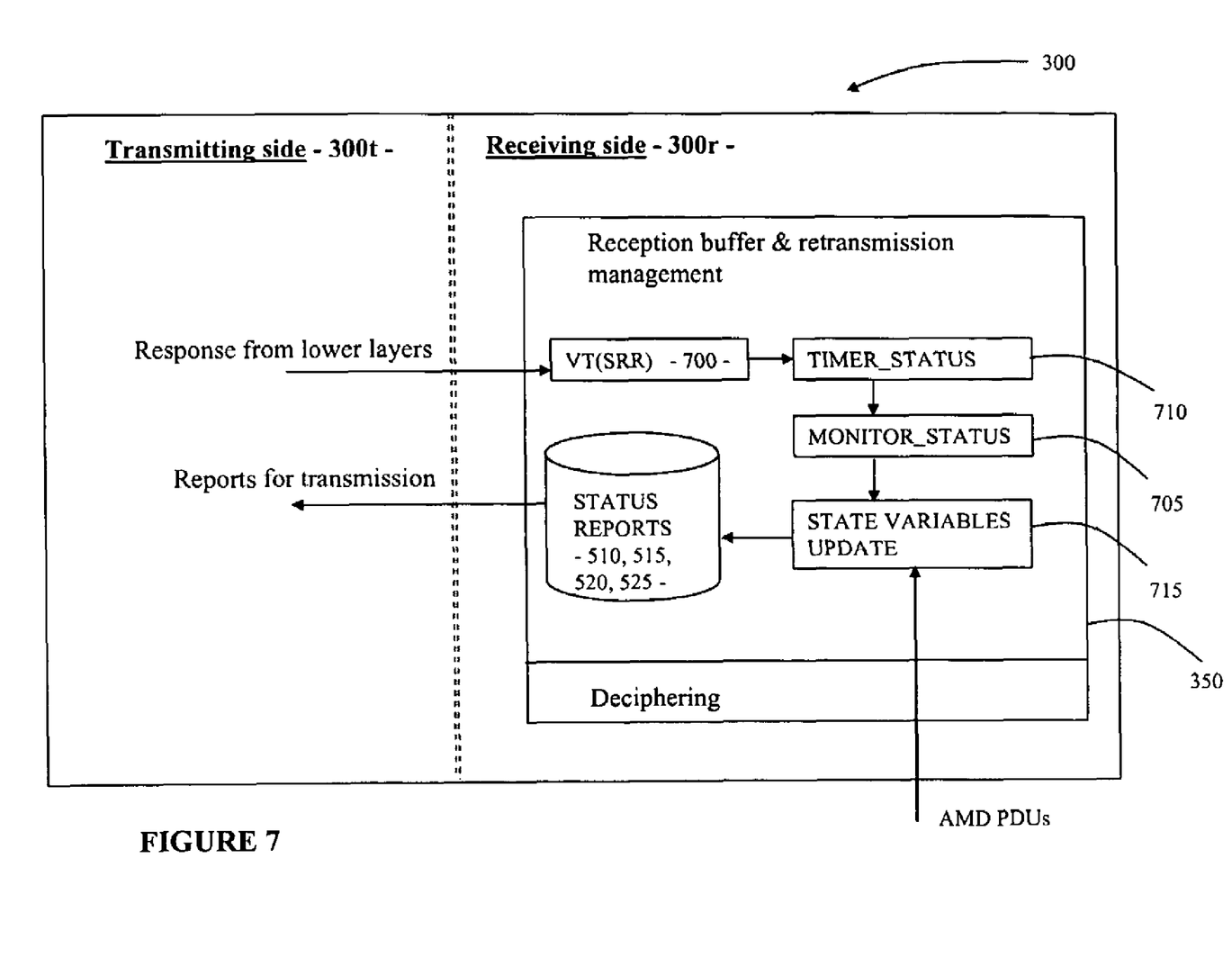
FIG. 7 shows in more detail functional blocks of a reception buffer and retransmission management function that might be present in the radio link entity of FIG. 3.

Referring to FIG. 7, in order to avoid problems arising with lost status reports, the reception buffer and retransmission management function 350 on the receiving side 300*r* of the RLC entity 300 is equipped with monitoring and timing functions 705, 710, "MONITOR_STATUS" and "TIMER_STATUS", as follows.

In normal RLC transmission with a status report function configured, incoming AMD PDU sequence numbers are delivered to a "State Variables Update" function 715. Depending on the sequence numbers of the received PDUs, and of corrupted or missing PDUs, state variables of the receiving side 300*r* are updated appropriately. AMD PDUs should be received in order, in ascending sequence numbers. If this is the case, VR(R) and VR(H) will remain equal and be updated in step. If one or more PDUs is missing, VR(H) will be updated but VR(R) will not. At this point, the RLC entity 300 will trigger a status report, identifying the missing PDU(s). Status reports 510, 515, 520, 525 are sent via the transmitting side 300*t*, in known manner.

RLC protocols dictate that there can only be one status report outstanding at one particular moment. A status prohibit function is normally configured to prevent the sending of a new status report too soon after having sent the previous one. Thus it is possible for a status report to have been triggered but not sent. It will be held until the status prohibit function allows it to be transmitted. The content of a held status report however is updated so that it is accurate at the time of sending rather than at the time of triggering. Because of the delay, it may be preferred in embodiments of the invention that this prohibit function is not acted on when sending a retransmitted status report. The content of retransmitted status reports is not updated and it will usually be preferred that they go at the earliest opportunity.

In embodiments of the present invention, when an indication is received from the lower layers on the transmitting side 300*t* that a status report has been transmitted, the monitoring and timing functions 705, 710 are started. By waiting for this indication, delay arising in the lower layers can be ignored. Once started, the timing function 710 measures a timed period which is greater than the round trip time for a status report to reach the transmitting RLC entity 300 and for retransmitted PDUs to be received.

Once the timing function TIMER_STATUS 710 has started timing a period, then the monitoring function MONITOR_STATUS 705 starts to monitor the sequence numbers of AMD PDUs subsequently received against the missing PDUs for which the status report contained a NACK. It can do this by comparing the incoming sequence numbers against VR(R) and VR(H). If the sequence number of a PDU received during the timed period is between VR(R) and VR(H), then it has almost certainly been retransmitted in response to the status report. This means in turn that the status report was safely received at the transmitting RLC entity 300 and the timing and monitoring functions 710, 705 can be terminated. However, if no such PDU is received during the timed period, then a repeat status report is triggered and the process repeated.

MONITOR_STATUS 705 therefore not only monitors the sequence numbers of incoming PDUs but relates these to the state variables, in particular VR(R) and VR(H), in order to analyse whether the PDU was retransmitted in response to a status report and thus whether it can be inferred that the status report was safely received.

4.1 Worked Example 1

Figures 8, 9:
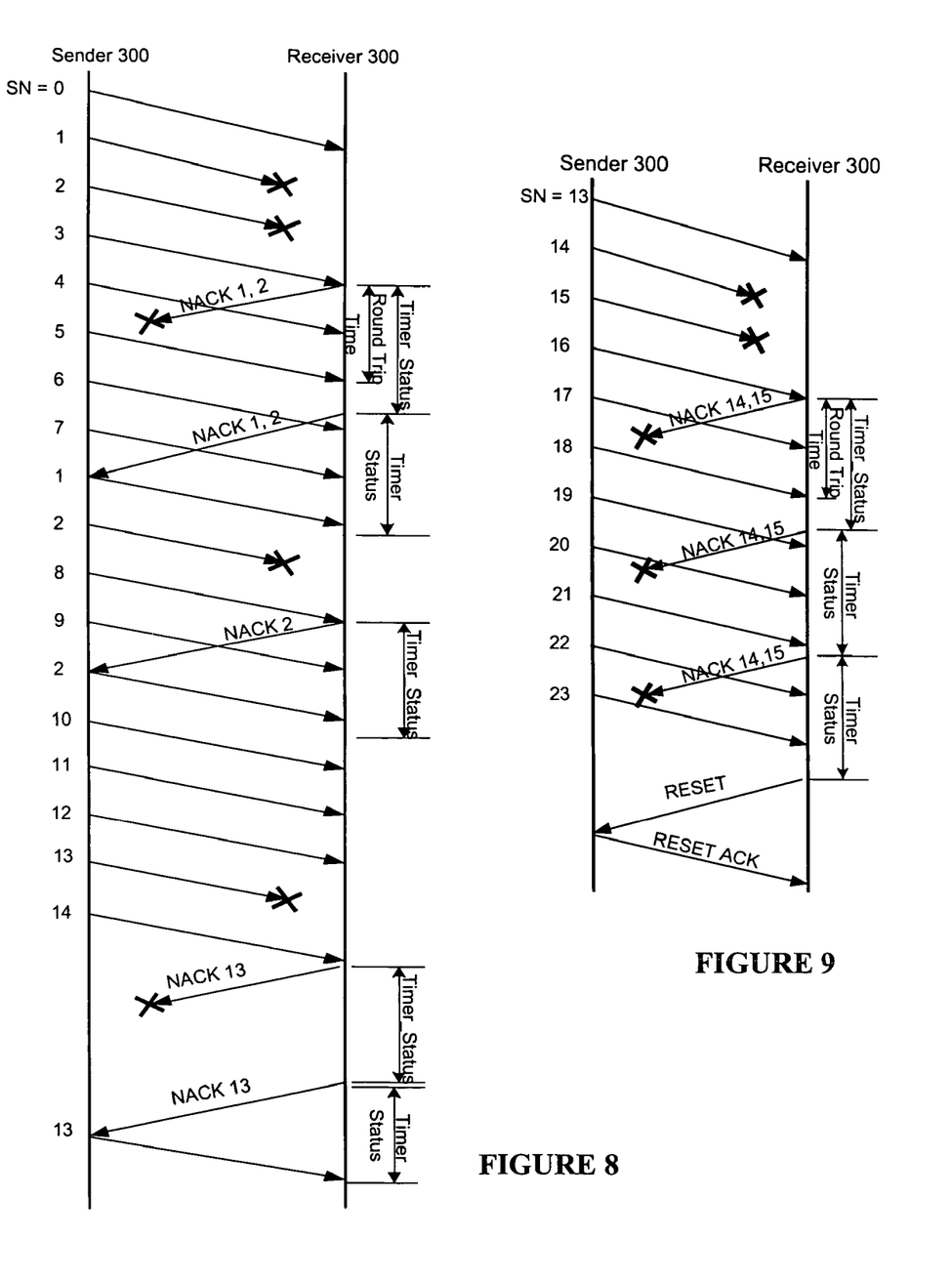
FIG. 8 shows a first transmission sequence between RLC entities as shown in FIG. 3, illustrating a lost status report and the avoidance of stalling.
FIG. 9 shows a second transmission sequence between RLC entities, illustrating a general recovery mechanism coming into play.

Referring to FIG. 8, in use of a working embodiment of the present invention, the following sequence of events might take place:

A sending RLC entity 300 ("Sender") transmits a sequence of AMD PDUs to a receiving entity 300 ("Receiver") starting at SN=0. SN=1 and SN=2 are not received properly and therefore VR(R) will drop behind VR(H). SN=3 is received properly. Since this is greater than the current value for VR(R), which is only "1", a status report is triggered, showing NACKs against SN=1 and SN=2. TIMER_STATUS and MONITOR_STATUS are started and TIMER_STATUS times a period slightly greater than the round trip time for a status report to be transmitted and for a PDU to be retransmitted in response. However, the status report is lost or corrupted and no PDUs are retransmitted. When the TIMER_STATUS period expires, the status report is retransmitted and VR(SRR) updated to the value "1". TIMER_STATUS and MONITOR_STATUS are restarted. This time, the status report is safely delivered and the missing PDU SN=1 is retransmitted. Receipt of the missing PDU stops TIMER_STATUS and MONITOR_STATUS and the value for VR(SRR) is cleared.

To this point, in practice, even without an embodiment of the invention then a further status report would eventually be triggered because the transmitting entity 300*t* has continued to send fresh PDUs and these will be out of sequence, having sequence numbers greater than VR(R). However, particularly if the status prohibit function is not acted on, the use of an embodiment of the invention may resolve the problem earlier.

The transmitting entity 300 next sends PDU SN=2, the other sequence number showing a NACK in the retransmitted status report. However, the PDU is lost and TIMER_STATUS and MONITOR_STATUS are started afresh. This time, the PDU is safely retransmitted and TIMER_STATUS and MONITOR_STATUS are stopped.

A particular strength of embodiments of the invention lies in dealing with the following sequence. The transmitting entity 300 continues to send in-sequence PDUs until SN=13 is lost. PDU SN=14 is then the last to be sent. (This could be because the transmitting RLC entity 300 has filled its transmission window, or there are no more data to send, or there is a suspension at the transmitting entity 300 whereby the transmitting entity 300 is not allowed to transmit PDUs with SN>an indicated SN. In the case of suspension, retransmission would still be allowed. Suspension occurs for example when a ciphering configuration is to be changed.) A status report showing a NACK against SN=13 is sent and TIMER_STATUS and MONITOR_STATUS are started but the status report is lost or corrupted and no further PDUs are received. In the prior art, this situation could lead to stalling of the transmission but MONITOR_STATUS does not need to receive further PDUs. When the TIMER_STATUS period expires, MONITOR_STATUS will not have detected any retransmitted PDUs and therefore triggers retransmission of the status report. VR(SRR) is updated to the value "1". This time the status report is safely received and PDU SN=13 retransmitted. VR(R) can be updated, TIMING_STATUS and MONITOR_STATUS are stopped and VR(SRR) is cleared.

4.2 Worked Example 2

Referring to FIG. 9, it is always possible that the retransmitted status reports will also be lost and this situation is shown. PDU SN=14 and PDU SN=15 are lost and an initial status report is sent showing NACKs against them. Although the status report is subsequently retransmitted twice, it is lost each time and VR(SRR) reaches its preset maximum value, in this case "2". This triggers a known recovery mechanism: a RESET PDU is sent successfully and RESET ACK received.

In operation, there is a risk that PDUs retransmitted by the transmitting entity 300 in response to a status report will be received in a following TIMER_STATUS period, after retransmission of the status report. Although this might stop TIMING_STATUS and MONITOR_STATUS inappropriately, either all of the retransmitted PDUs will have been received correctly or, if any are still missing, a fresh status report will be triggered because out of sequence PDUs have been received.

The following general points apply to use of embodiments of the invention:
  if there are no retransmitted PDUs arriving while TIMER_STATUS is running, and only new PDUs arriving, a status report must have been lost as retransmitted PDUs have priority over non-transmitted PDUs
  however, if there are no PDUs arriving at all while TIMER_STATUS is running, it cannot be known whether a status report was lost or a retransmitted PDU was either corrupted or not transmitted at all.

In either case, it is best to retransmit the status report, as will be done using an embodiment of the present invention. In the latter case, with no PDUs arriving at all, it may be particularly important to retransmit the status report and request retransmission of missing PDUs because window restrictions at the transmitting entity 300 may be blocking all fresh PDUs.

4.3 Period Set by Timer

The length of the timed period will be configured by the UTRAN 100 and sent to the UE 130 in a RRC ("Radio Resource Control") protocol message. This follows the same known principle as dealing with other RLC configuration data. The actual period set is optional but it might for example be made dependent on the number of NACKs in the relevant status report. This increases complexity but can allow improved detection of a safely delivered status report where retransmitted PDUs are also lost.

It can be seen in FIGS. 8 and 9 that the period set by TIMER_STATUS 710 affects the number of PDUs that MONITOR_STATUS 705 will detect. If the period is short, MONITOR_STATUS 705 will only detect a relatively small number of incoming PDU sequence numbers before triggering retransmission of a status report. In practice, this might be an advantage since the transmitting RLC entity 300 would be requested to retransmit earlier than in the case of a longer period set by TIMER_STATUS 710.

A status report can contain one or several NACKs and thus can request retransmission of one or several PDUs. It might be preferred for diagnostic purposes that the period set by TIMER_STATUS 710 is at least partially dependent on the number of NACKs in the relevant status report. It might be decided that this dependency should be either direct or indirect.

If the period set by TIMER_STATUS 710 is directly dependent, it would be greater for a retransmitted status report having more NACKs. This means that even if the first few PDUs of a retransmitted status report are lost in retransmission, then MONITOR_STATUS 705 has an increased chance of detecting safe receipt of the last four or three, thus providing the information that the retransmitted status report was safely received.

Alternatively, it might be preferred in practice that the period set by TIMER_STATUS 710 is reduced for a retransmitted status report with a greater number of NACKs. That is, the period set by TIMER_STATUS 710 is inversely dependent. This might be preferred because the increased number of lost PDUs indicates a sustained transmission failure rate. In order for VR(R) to progress, the earliest of the missing PDUs has to be successfully retransmitted. This may happen earlier with a shorter period set by TIMER_STATUS 710.

5. General Rules

A general set of rules can be recognised as representing behaviour of a RLC entity 300 on receiving PDUs when implementing both known status report processes and the monitoring process of embodiments of the present invention. These are as follows:

1. if PDU(SN)=VR(R), then in-sequence transmission has been successful. Update VR(R) and deliver any SDUs in the PDU to higher layers.

2. if PDU(SN)>VR(R) and VR(R)=VR(H), then there is at least one missing PDU indicated by this PDU received out of order. This triggers a status report and thus TIMER_STATUS 710 followed by MONITOR_STATUS 705. VR(H) is updated.

3. if PDU(SN)>VR(R) and <VR(H), again this PDU is out of order. Since VR(H)>VR(R) already, at least one status report will already have been triggered. The PDU is almost certainly a PDU retransmission in which case a status report has been correctly received. If TIMER_STATUS 710 is running, it will be stopped and no immediate action taken. An updated status report will be triggered in the normal course of events because there are still missing PDUs. PDUs may already have been received with sequence numbers between PDU(SN) and VR(R), perhaps due to earlier retransmissions, and these will simply show an ACK in the updated status report.

4. if PDU(SN)<VR(R)

then this PDU is probably a belated retransmission. Discard PDU.

5. if PDU(SN)>VR(MR)

then there is a problem in the transmitting RLC entity 300. Discard PDU.

It will usually be preferred that status reports are only resent up to a maximum number of times, whereafter a different and more general recovery process may be used. Preferably, a counter is provided at the receiving side 300r to keep track of the number of status report retransmissions: VT(SRR). Once VT(SRR) reaches the configured limit, MAX_SRR, a process such as the known RLC reset procedure (using a RESET PDU as mentioned above) can be triggered. MAX_SRR can be set by the UTRAN 100 and delivered to the UE 130 using radio resource control messages in known manner. For example, MAX_xxx parameters for RLC are set out in the Radio Resource Control Technical Specification 25.331 to have the following values, and these could be applied: MAX_xxx Integer (1, 4, 6, 8, 12, 16, 24, 32).

In the above description, no distinction is made between piggybacked and independent STATUS PDUs and this is consistent with RLC protocols. In practice however, piggybacked STATUS PDUs are contained in AMD PDUs. These are already subject to procedures for detecting lost data units and, if lost, will trigger a NACK in a standard status report sent from the far end of the transmission link. Hence embodiments of the invention may be found to have more benefit in dealing with the occurrence of non-piggybacked STATUS PDUs.

It may be noted that although RLC entities 300 as described above are capable of assembling received AMD PDUs into an ordered sequence, it is not always the case that they will be delivered to the higher layers in that ordered sequence. There may be an option to configure "out-of-sequence delivery".

The timing and monitoring process described above has significant advantages. Firstly, it is not dependent on receiving any further PDUs. If no further PDUs are received, it will simply trigger an additional set of NACKs as appropriate until the general error/recovery process is triggered. Secondly, it works for all types of status report, whether sent as a control PDU or piggybacked. Thirdly, because it monitors all the sequence numbers in the current transmission window, more than one NACK can be monitored over the same time period.

In the description above, a UMTS system is described. However, embodiments of the invention could find application in any system where a radio link, or other air interface, is subject to control processes. For example, the invention might find application in GSM/GPRS ("Global System for Mobile communication"/"General Packet Radio Service"), or CDMA 2000 ("Code Division Multiple Access" 2000). It may also find application in non-air interfaces where there is a link layer in the protocol stack, such as in cable modems and possibly as part of the TCP/IP ("Transmission Control Protocol/Internet Protocol") control for example in the context of mobile IP.

It might be noted that the word "comprising" as used in this specification is intended to be broadly interpreted so as to include for instance at least the meaning of either of the following phrases: "consisting solely of" and "including amongst other things".

The invention claimed is:

1. Data unit management apparatus for use in communications receiving equipment in receiving data units over a transmission link, the apparatus comprising:
    a data unit reception monitor for monitoring receipt of data units via a logical channel;
    a retransmission request sender for triggering the sending of at least one retransmission request in respect of one or more missing or corrupted data units; and
    a retransmitted data unit monitor for monitoring receipt of one or more retransmitted data units via the logical channel,
    wherein the retransmitted data unit monitor comprises a timer for timing a predetermined period, and is configured to monitor receipt within the predetermined period of retransmitted data units and to trigger at least one repeat retransmission request in the event that no data units subject to an earlier retransmission request are received within the associated predetermined period, the retransmitted data unit monitor being configured to trigger up to a predetermined number of such repeat retransmission requests in respect of said earlier retransmission request, such that a recovery mechanism is initiated in the event that no data units subject to the earlier retransmission request are received via the logical channel within the associated predetermined periods.

2. Data unit management apparatus according to claim 1, wherein the timer is adapted to be triggered to start timing by the sending of a retransmission request.

3. Data unit management apparatus according to claim 1, wherein a sent retransmission request comprises a status report indicating a reception status for at least one data unit.

4. Data unit management apparatus according to claim 1 wherein a sent retransmission request comprises a status report indicating a reception status for each of more than one data unit.

5. Data unit management apparatus according to claim 1, wherein each received data unit is identifiably distinct, the receiving equipment is adapted to assemble said identifiably distinct data units in an ordered sequence of data units, and the retransmitted data unit monitor is adapted to identify a retransmitted data unit by reference to its position in a sequence of data units received by the receiving equipment relative to its position in said ordered sequence.

6. Data unit management apparatus according to claim 5 wherein the apparatus further comprises a sequence reception state monitor for monitoring the reception state of said ordered sequence by reference to the position in the ordered sequence of received data units, the sequence reception state monitor being adapted to maintain updatable values for at least two variables representing said reception state, and wherein the retransmitted data unit monitor is adapted to identify a retransmitted data unit by comparing its position in the ordered sequence with current values for said at least two variables.

7. Data unit management apparatus according to claim 6 wherein a current value for one of said variables is set by the most recently received data unit whose position in the ordered sequence is in-sequence.

8. Data unit management apparatus according to claim 6 wherein a current value for one of said variables is set by the received data unit whose position is latest in the ordered sequence.

9. Data unit management apparatus according to claim 1, wherein the retransmitted data unit monitor is adapted to terminate timing by the timer on receipt of at least one retransmitted data unit within the predetermined period associated with a retransmission request in respect of that data unit.

10. Data unit management apparatus according to claim 1 wherein the retransmitted data unit monitor is adapted to initiate a recovery mechanism in the event that no data units subject to the earlier retransmission request are received within the associated predetermined periods.

11. Data unit management apparatus according to claim 1 wherein the predetermined period is at least partially dependent on the number of data units for which a retransmission request is made.

12. Data unit management apparatus according to claim 11 wherein the predetermined period is at least partially directly dependent on the number of data units.

13. Data unit management apparatus according to claim 11 wherein the predetermined period is at least partially inversely dependent on the number of data units.

14. Data unit management apparatus according to claim 1, for use in receiving identifiably distinct data units over a transmission path that comprises an air interface.

15. Data unit management apparatus according to claim 14 wherein said air interface comprises a radio link.

16. Receiving apparatus for use in communications, comprising data unit management apparatus according to claim 1.

17. Receiving apparatus for use in receiving a plurality of data units via a logical channel and ordering them into a predetermined sequence, the receiving apparatus comprising:
    i) a missing data unit detector for detecting data units receivable via the logical channel which are corrupted or missing from the sequence, a retransmission request sender for triggering requesting retransmission of such data units via said logical channel, and a retransmission failure detector having a timer, said retransmission failure detector for detecting no response to a retransmission request within a predetermined period timed by the timer, the missing data unit detector being configured to trigger up to a predetermined number of repeat retransmission requests in respect of said retransmission request, such that a recovery mechanism is initiated in the event that no data units subject to said retransmission request are received via the logical channel within the associated predetermined periods.

18. The receiving apparatus of claim 17 where the missing data unit is further configured to initiate a recovery mechanism in the event that no data units subject to said retransmission request are received within the associated predetermined periods.

19. A method of receiving identifiably distinct data units at a receiving, entity via a logical channel from a transmitting entity, which method comprises:

detecting at the receiving entity one or more lost or damaged data units;

sending to the transmitting entity a retransmission request identifying at least one of said lost or damaged unit(s) for retransmission via said logical channel;

monitoring data units received at the receiving entity for receipt of at least one data unit so identified within a predetermined time period after sending the retransmission request;

repeating the sending and monitoring for a predetermined number of times in the event that no data units subject to an earlier retransmission request are received via said logical channel within the time period, such that a recovery mechanism is initiated in the event that no data units subject to said retransmission request are received within the associated predetermined periods; and terminating on receipt at the receiving entity within the time period of at least one data unit subject to an earlier retransmission request.

20. A method according to claim 19 wherein said predetermined time period starts on sending the retransmission request.

21. A method according to claim 19 wherein said retransmission request comprises a status report indicating a reception status for each of more than one data unit.

22. A method according to claim 19 comprising:

initiating a recovery mechanism after completing the sending and receiving the predetermined number of times.

23. A method according to claim 19 wherein the method is a method of receiving identifiably distinct data units over a transmission link that comprises an air interface.

24. A method according to claim 23 wherein said transmission link comprises a radio link.

* * * * *

UNITED STATES PATENT AND TRADEMARK OFFICE
CERTIFICATE OF CORRECTION

PATENT NO. : 7,525,908 B2 Page 1 of 1
APPLICATION NO. : 10/949942
DATED : April 28, 2009
INVENTOR(S) : Patrik Olsson and Gjalt de Jong

It is certified that error appears in the above-identified patent and that said Letters Patent is hereby corrected as shown below:

Title Page, Item (57) Abstract:
In line 1 of the Abstract, please delete "(REC)" and insert therefor:

--(RLC)--.

Signed and Sealed this

First Day of September, 2009

David J. Kappos
*Director of the United States Patent and Trademark Office*